United States Patent
Mumford et al.

(10) Patent No.: US 11,280,750 B2
(45) Date of Patent: Mar. 22, 2022

(54) BOILING POINT WATER ACTIVITY MEASUREMENT

(71) Applicant: METER GROUP, INC. USA, Pullman, WA (US)

(72) Inventors: Alex T. Mumford, Pullman, WA (US); Gaylon S. Campbell, Pullman, WA (US)

(73) Assignee: METER Group, Inc. USA, Pullman, WA (US)

( * ) Notice: Subject to any disclaimer, the term of this patent is extended or adjusted under 35 U.S.C. 154(b) by 228 days.

(21) Appl. No.: 16/678,155

(22) Filed: Nov. 8, 2019

(65) Prior Publication Data
US 2021/0140903 A1    May 13, 2021

(51) Int. Cl.
*G01N 25/10* (2006.01)
*G01D 21/02* (2006.01)

(52) U.S. Cl.
CPC .............. *G01N 25/10* (2013.01); *G01D 21/02* (2013.01)

(58) Field of Classification Search
CPC ........ G01N 25/10; G01D 21/02; B01B 1/005; B08B 15/00; A01G 11/00; F04D 29/66; C09K 5/00; H03M 1/00
See application file for complete search history.

(56) References Cited

U.S. PATENT DOCUMENTS

| | | | | |
|---|---|---|---|---|
| 4,905,505 A | * | 3/1990 | Reed | G01N 7/00 73/64.46 |
| 7,628,057 B1 | * | 12/2009 | Solomon | G01N 7/14 73/64.45 |
| 2015/0063408 A1 | * | 3/2015 | Byers | G01N 21/39 374/45 |
| 2015/0135747 A1 | * | 5/2015 | Bertilsson | F25B 39/028 62/118 |

OTHER PUBLICATIONS

Line Chart, Apr. 7, 2019, https://web.archive.org/web/20190407104336/https://en.wikipedia.org/wiki/Line_chart (Year: 2019).*
Saxton, and Smith. "The Activity Coefficient of Potassium Chloride in Aqueous Solution From Boiling Point Data." Journal of the American Chemical Society, vol. 54, Jul. 6, 1932, pp. 2626-2636.

* cited by examiner

*Primary Examiner* — Daniel R Miller
*Assistant Examiner* — Eric Sebastian Von Wald
(74) *Attorney, Agent, or Firm* — Dorsey & Whitney LLP

(57) ABSTRACT

Water activity measurement systems and methods for determining water activity of material samples in a test environment under controlled temperature and pressure conditions. The gas pressure in a test chamber is reduced or held constant while sample temperature is simultaneously tracked. The water activity of the sample can be determined by detecting the boiling point of the sample, at reduced pressure, over time, and calculating water activity using the atmospheric pressure and the saturation vapor pressure at the boiling temperature. The boiling point can be determined by (Continued)

observing an inflection point in the sample temperature over time, and the pressure and temperature at the onset of boiling can be determined at an intersection of trend lines extending from substantially linear intervals of temperature recordings over time.

16 Claims, 4 Drawing Sheets

BOILING POINT WATER ACTIVITY MEASUREMENT

TECHNICAL FIELD

The present disclosure generally relates to instruments and methods used to measure water activity in a sample material and specifically relates to instruments and methods used to measure water activity by detecting boiling in a sample.

BACKGROUND

Water activity and water potential are measures of the energy state of water in hydrated systems such as foods and soils. Knowledge of the water activity of a system is desirable to understand how the system behaves. For example, water activity affects the availability of water for plant or microbial growth and water movement in a system is due to gradients in water activity or water potential.

Water activity is conventionally measured by equilibrating the water in the sample with an external surrounding phase (i.e., gas, liquid or solid) and then measuring the water activity in the equilibrated phase. When a test sample is initially positioned in a chamber of a testing instrument, the sample and its immediate surroundings are not in equilibrium, and the user must wait to obtain the water activity reading, sometimes for extended periods of time, until equilibrium is reached. Additionally, in some cases, equilibrium is difficult or impossible to reach because the chamber itself takes up water, and sample materials and other impurities in the testing chamber can slow or prevent equilibration. There is therefore a constant need for improvements to water activity measurements and instrumentation.

SUMMARY

One aspect of the present disclosure relates to a method of manufacturing a water activity sensor. The method can comprise positioning a temperature sensor in a sealed chamber, connecting a gas pressure sensor to the sealed chamber to measure an internal gas pressure of the sealed chamber, connecting a gas evacuating device to the sealed chamber, and connecting a computing device to the temperature sensor and to the gas pressure sensor. The computing device can be configured to determine a temperature of a material sample using the temperature sensor, determine an internal gas pressure of the sealed chamber using the gas pressure sensor, detect onset of boiling in the material sample, and calculate a water activity of the material sample based on the temperature of the material sample and internal gas pressure at the onset of boiling.

In some embodiments, the computing device can be configured to evacuate gas from the sealed chamber using the gas evacuating device. Detecting the onset of boiling in the material sample can comprise adjusting over time at least one of the internal gas pressure and the temperature and determining an intersection point of at least two trend lines in a series of points falling on a plot of the temperature measured over time. Detecting the onset of boiling in the material sample can also comprise adjusting over time at least one of the internal gas pressure and the temperature and determining an intersection point of at least two trend lines in a series of points falling on a plot of the internal gas pressure versus temperature.

In some embodiments, the water activity is calculated by dividing the internal gas pressure of the sealed chamber at the onset of boiling by a saturation vapor pressure of the material at the onset of boiling. The computing device can be further configured to keep constant the internal gas pressure of the sealed chamber while adjusting the temperature of the material sample. Alternatively, the computing device can be further configured to keep constant an internal temperature of the sealed chamber while adjusting the internal gas pressure of the sealed chamber. The computing device can also be further configured to simultaneously adjust the internal gas pressure and the temperature.

Another aspect of the disclosure relates to a water activity measurement device comprising a housing having an internal chamber configured to receive a material sample, a temperature transducer to measure a temperature within the internal chamber, a pressure transducer to measure gas pressure in the internal chamber, an evacuating device to reduce the gas pressure in the internal chamber, and a connector to output measurements from at least one of the temperature transducer and the pressure transducer to a computing device.

The evacuating device can be configured to induce boiling in a material sample. The temperature transducer can be configured to measure an internal temperature of a material sample or to measure a temperature of the internal chamber. The device can also comprise the computing device, wherein the computing device is configured to reduce the gas pressure in the internal chamber using the evacuating device, receive the temperature from the temperature transducer, and receive the gas pressure from the pressure transducer.

The computing device can be configured to detect an intersection point of two trend lines in a series of points falling on a plot of the temperature over time. The computing device can also be configured to detect a boiling point of a material sample as the gas pressure in the internal chamber is reduced.

Another aspect of the disclosure relates to a method of measuring water activity. The method can comprise reducing gas pressure on a material sample, detecting boiling in the material sample as the gas pressure is reduced, determining a saturation vapor pressure at the material sample and a temperature of the material sample at the onset of boiling, and calculating water activity using the saturation vapor pressure and the temperature of the material sample at the onset of boiling.

Detecting boiling can comprise determining two trend lines in a series of points falling on a plot of a gas pressure at the material sample versus the temperature of the material sample, and determining the saturation vapor pressure and the temperature of the material sample where the two trend lines intersect. The two trend lines can correspond to two substantially linearly aligned portions of a series of points falling on a plot of the temperature of the material sample over time. A first trend line of the two trend lines can extend along a first portion of the series of points having a lesser slope than a second trend line of the two trend lines extending along a second portion of the series of points. The second portion of the series of points can occur after the first portion. The boiling can be detected while the material sample is out of vapor equilibrium with atmosphere surrounding the material sample.

The above summary of the present invention is not intended to describe each embodiment or every implementation of the present invention. The figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
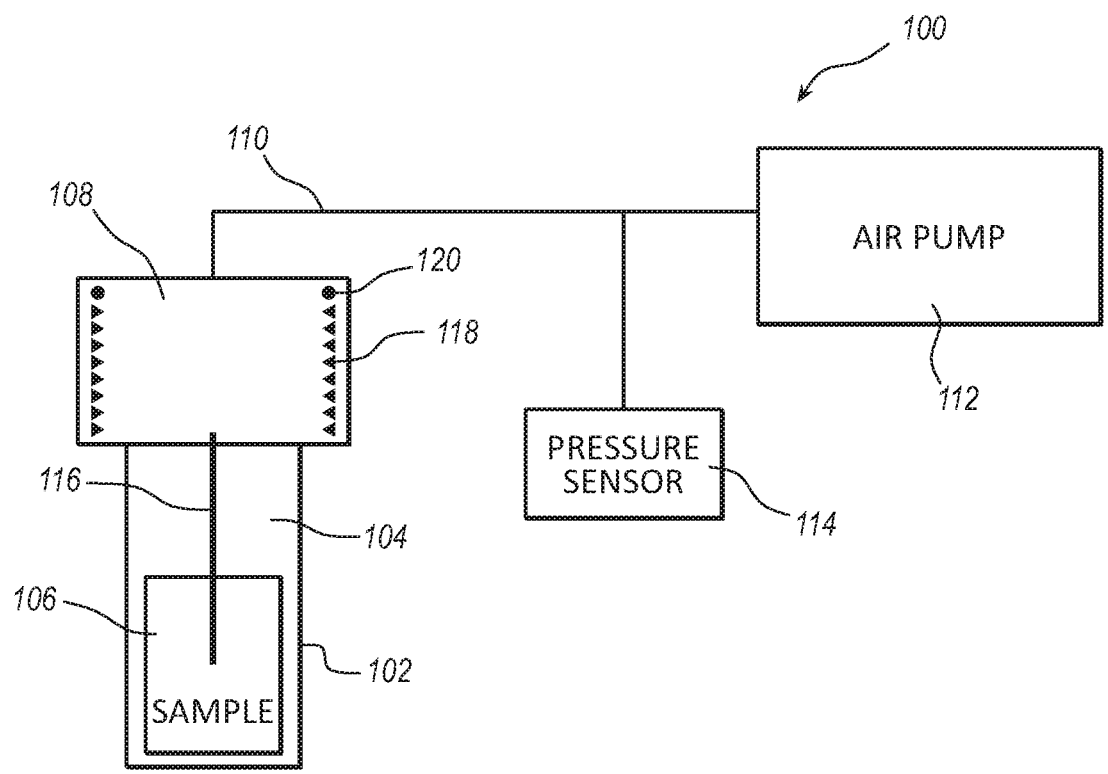
FIG. 1 is a schematic diagram of a water activity sensor.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to apparatuses, systems, and methods to quickly and directly measure water activity of a sample material or system. The water activity of pure water is 1.0. When water contains solutes, such as salt or sugar, or is adsorbed on proteins, starch, cellulose, or soil particles, the water activity is reduced. A decrease in water activity decreases the freezing point and vapor pressure of the water and elevates boiling point relative to pure water at the same temperature. These are called the colligative properties of water. Almost all conventional water activity instruments determine water activity by measuring the lowered vapor pressure.

Water activity can also be determined by measuring the freezing point depression or boiling point elevation. However, temperature affects water activity significantly, so there can be a substantial difference between a water activity value of a sample as measured at the freezing point temperature and a water activity value of the sample at higher temperature.

It is well known that solutes raise the boiling point of water. Boiling temperature is widely used to measure the concentration of solutes, such as, for example, in candy making. Aspects of the present disclosure relate to the measurement of temperature of a sample under controlled conditions in order to convert the measurement into water activity. For example, methods of the present disclosure relate to manipulating gas pressure in a testing chamber to affect the temperature at which water boils in the sample. By sufficiently reducing gas pressure in the chamber, water can be made to boil at a temperature that is much lower than atmospheric pressure, such as at or about room temperature (i.e., about 65-75 degrees Fahrenheit). The temperature at which the water boils in the sample is the temperature at which its vapor pressure equals the gas pressure in the chamber.

Aspects of the present disclosure include instruments having a temperature sensing device configured to read the temperature of a sample material within a sealed chamber. The pressure of this chamber can be manipulated using an evacuating device such as, for example, a vacuum pump, and the pressure can be measured using a pressure sensor. Thus, the gas pressure in the chamber is decreased, and the pressure and temperature within the chamber are continuously recorded. After a relatively short time, the test can be terminated and the sensor measurements can be analyzed. In the data, two substantially linear trend line segments in the plot of collected data can be determined. These two segments can then be extrapolated to determine an inflection point in the temperature or pressure that indicates the onset of boiling. The values of the material sample temperature and the internal gas pressure of the chamber at the onset of boiling can then be used to calculate the water activity of the sample material. For instance, the water activity can be calculated by dividing the internal gas pressure of the sealed chamber at the onset of boiling by a saturation vapor pressure of the material at the onset of boiling (which is based on the temperature of the sample at the onset of boiling).

In some embodiments, the temperature and pressure are changed simultaneously, and the temperature and pressure within the chamber are continuously recorded throughout the test. In some cases, the gas pressure in the chamber is held constant throughout the test, and the sample temperature is scanned while it changes over time. The boiling point of the water in the sample can then be determined by referencing a transition in the series of points falling on a plot of the temperature over time at that specific constant pressure. In another embodiment, the temperature of the chamber is held constant while gas pressure in the chamber is changed continuously through a range. In this case, the points representing internal sample temperature and gas pressure are monitored and plotted to detect the onset of boiling based on intersecting trend lines on each side of a transition or inflection point.

In one embodiment, a measurement device is set forth that comprises an internal chamber configured to receive a material sample in a housing, a temperature transducer to measure temperature within the chamber, a pressure transducer to measure gas pressure in the internal chamber, an evacuating device to reduce gas pressure in the internal chamber, and a connector to output measurements from at least one of the temperature transducer and the pressure transducer to a computing device. The evacuating device can remove gas from the internal chamber to induce boiling in the material sample. The temperature transducer can measure an internal temperature of the material sample while the pressure is changed by the evacuating device. In some cases, a temperature transducer can be included to measure the temperature of the gas within the chamber. The computing device can be configured to control the evacuating device and to receive measurements of temperature and gas pressure from the temperature and pressure transducers, respectively.

Embodiments of the present disclosure can improve the rate of speed at which a water activity measurement can be obtained from a sample because the boiling point of the sample can be relatively quickly changed by adjusting the chamber temperature or internal gas pressure as compared to the time needed for a sample to reach vapor equilibrium with the atmosphere inside the chamber. Devices and methods of the present disclosure are also not susceptible to impurities and other issues preventing the sample from reaching vapor equilibrium during the test period. Furthermore, the water activity can be conveniently measured with a device at or about room temperature, thereby improving accuracy of the measurement.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

FIG. 1 is a schematic diagram of a water activity measurement device 100 according to an aspect of the present disclosure. The measurement device 100 can include a housing 102 having an internal chamber 104. A sample material 106 can be positioned within the internal chamber 104 and can be sealed in place by a cap 108. A tubing 110 can connect the housing 102 to an evacuating device 112 and to a pressure transducer 114. A temperature transducer 116 can also be positioned within the housing 102 and can be configured to measure internal temperature of the sample material 106 and/or the temperature of the gas in the internal chamber 104.

Measurement device 100 can be referred to as a water activity sensor, a water activity measurement device, or an apparatus for measuring water activity. The housing 102 can be configured with an internal chamber 104 sized sufficient to receive a desired sample material 106. The sides of the housing 102 can be sealed, wherein they are airtight and allow the internal pressure of the chamber 104 to change while a test is being conducted. The cap 108 can therefore be tightly attachable to the housing 102, such as, for example, by threading 118, an O-ring 120, or related attachment and sealing features. In various embodiments, other shapes and sizes of a housing 102 can be used, such as a box-, pill-, or lozenge-shaped housing having a sealable door or other access opening.

The sample material 106 can comprise a material having water activity. Commonly, the sample material 106 can include a food or soil sample having moisture content. The sample material 106 can beneficially include a porous medium in order to facilitate insertion of a probe of the temperature transducer 116. Accordingly, the sample material 106 can be configured to surround the temperature transducer 116 in some embodiments. In other words, the temperature transducer 116 can be configured to be inserted into the sample material 106.

Tubing 110 is shown in FIG. 1 for convenient indication of connections in a pathway through which gas in the internal chamber 104 can be removed. The tubing 110 also schematically represents the connection between the pressure transducer 114 and the internal chamber 104. In some embodiments, the tubing 110 is omitted, and the evacuating device 112 can be directly connected to the housing 102 or cap 108. Similarly, the pressure transducer 114 can be directly connected to the cap 108 or to the housing 102.

Evacuating device 112 can comprise a peristaltic pump, a piston and cylinder apparatus (e.g., similar to a syringe), a vacuum pump, related devices, or combinations thereof. Accordingly, operation of the evacuating device 112 can reduce the internal gas pressure of the internal chamber 104 over time. The pressure transducer 114 and temperature transducer 116 can be actively monitored while the evacuating device 112 reduces the internal gas pressure so that the internal gas pressure and the sample temperature can be monitored over that time.

Pressure transducer 114 can include a pressure sensor such as, for example, a strain gauge pressure transducer, a capacitance pressure transducer, a potentiometric pressure transducer, a resonant wire pressure transducer, related devices, or combinations thereof. Temperature transducer 116 can include a thermocouple, such as a thermocouple inside of a needle, a thermistor, such as a thermistor inside of a needle, an overhead thermopile, a heat flux plate, related devices, or combinations thereof. The temperature transducer 116 can comprise a first temperature transducer for measuring the internal or surface temperature of the sample material 106 and a second temperature transducer for measuring the internal temperature of the gas within the internal chamber 104. In some embodiments, only one of the first and second temperature transducers is included.

Figure 2:
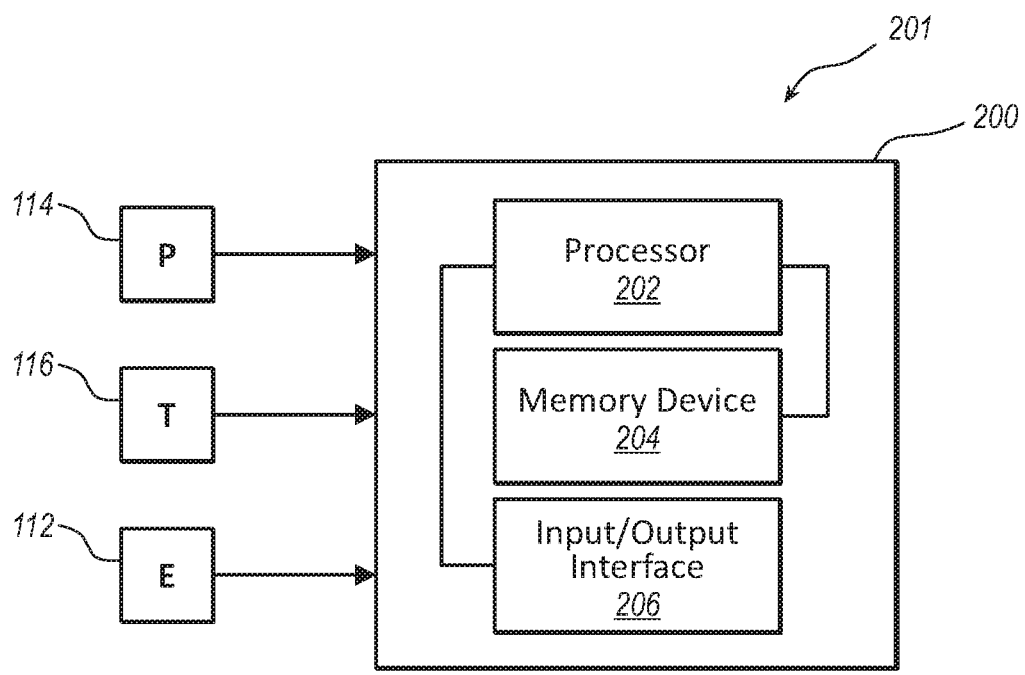
FIG. 2 is a block diagram of a system for measurement of water activity.

The pressure transducer 114 and the temperature transducer 116 can be electrically connected to a computing device 200 configured to receive and record the signals produced by the transducers 114, 116. FIG. 2 is a schematic diagram of an electrically-connected system 201 including the computing device 200, a pressure transducer 114, a temperature transducer 116, and the evacuating device 112. The computing device 200 can be configured to receive sensor signals from the transducers 114, 116. The computing device 200 can also be configured to control or send control signals to evacuating device 112.

The computing device 200 can include a processor 202 in electronic communication with a memory device 204 and an input/output interface 206. In various embodiments, the system 201 can comprise of various sets and subsets of the components shown in FIG. 2. Thus, FIG. 2 shows a variety of components that can be included in various combinations and subsets based on the operations and functions performed by the system 201 in different embodiments. When described or recited herein, the use of the articles such as "a" or "and" is not considered to be limiting to only one, but is instead intended to mean one or more unless otherwise specifically noted herein.

The processor 202 can comprise a central processing unit (CPU) connected via a bus to the memory device 204 and to the input/output interface 206. For example, one or more of these components can be connected to each other via a substrate, such as a printed circuit board or other substrate supporting the bus and other electrical connectors and providing electrical communication between the components. The bus can comprise a communication mechanism for communicating information between parts of the system 201.

The processor 202 can be a microprocessor or similar device configured to receive and execute a set of instructions stored by the memory device 204. The memory device 204 can be referred to as main memory, such as random access memory (RAM) or other dynamic electronic storage device for storing information and instructions to be executed by the processor 202. The memory device 204 can also include read-only memory (ROM) or another type of static storage device coupled to the bus for storing static or long-term information and instructions for the processor 202. For example, the memory device 204 can comprise a magnetic or optical disk, solid-state memory, or a comparable device. A power source (not shown) can comprise a power supply capable of providing power to the computing device 200 and/or other components connected to the bus or connected to the computing device 200. Thus, the power source can include a connection to an electrical utility grid or a battery system.

Instructions stored by the memory device 204 can comprise information, such as code, for executing processes and methods using components of the system 201. Such processes and methods can include, for example, the methods described elsewhere herein.

The input/output interface 206 can include input and output devices for interacting with or communicating with users or other electronic devices. For example, the input/output interface 206 can provide connectivity to sensors (e.g., 114, 116), peripheral input devices (such as a mouse and keyboard), output devices (such as a display screen), and a networked device such as a connected computer, a local area network (LAN), wide area network (WAN), the Internet, related devices and locations, and combinations thereof.

Figure 3:
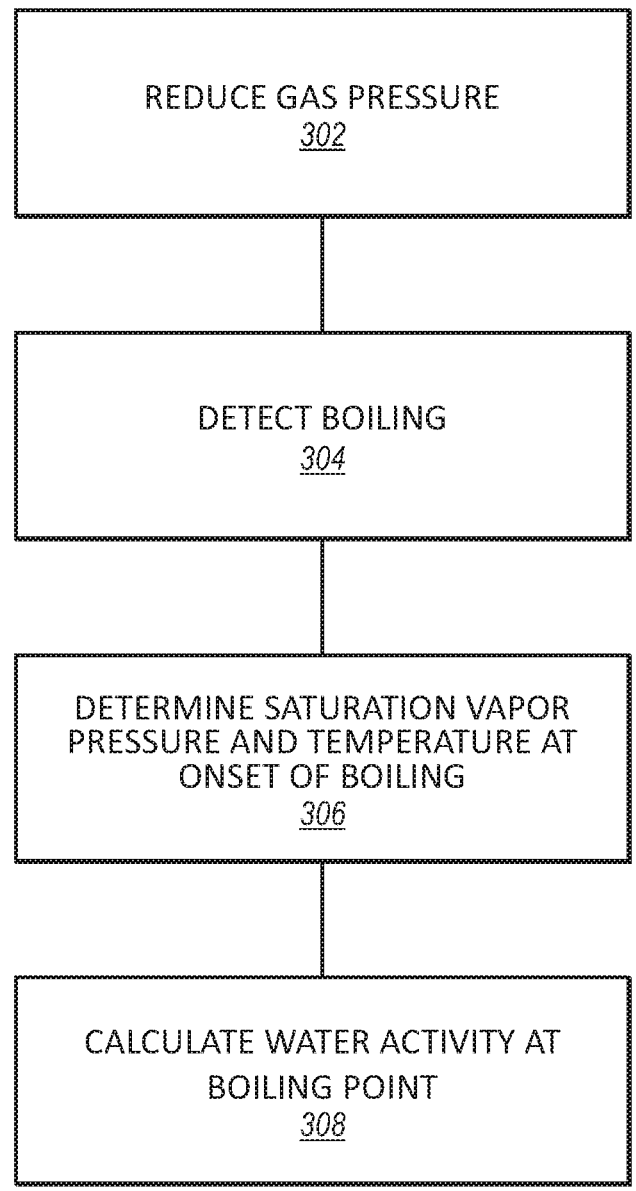
FIG. 3 is a process chart illustrating a method of measuring water activity.

The computing device 200 can perform steps of a method of measuring water activity. In some cases, user input and actions are also required to perform the method. FIG. 3 shows a process flowchart of an example method 300 for measuring water activity. Initially, a material sample can be positioned and air-sealed within a test chamber. In block 302, the controller can reduce gas pressure on the material sample. The controller can be the computing device 200, the material sample can be the material sample 106, and the gas pressure can be reduced using the evacuating device 112. In some embodiments, reducing the gas pressure can comprise removing (e.g., pumping out) air from a sealed internal chamber of the housing such as chamber 104. Reducing the gas pressure in the test chamber can simultaneously change the air temperature within the test chamber.

Figure 4:
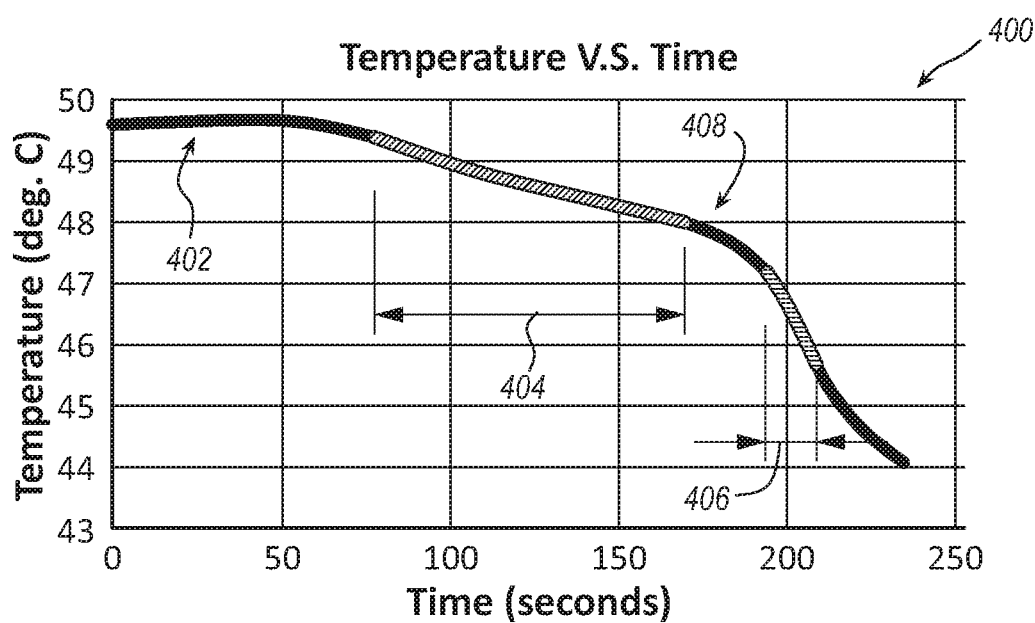
FIG. 4 is a plot of a sample temperature over time while measuring water activity using a measurement system of the present disclosure.

In block 304, a controller detects boiling in the material sample as the gas pressure is reduced. The onset of boiling can be determined by reference to a series of points falling on a plot of the sample internal temperature over time. FIG. 4 illustrates an example plot 400 of a series of points 402 representing the internal sample temperature as measured over time during a water activity measurement (i.e., as the pressure in the test chamber changes).

At time zero in FIG. 4, the series of points 402 of the sample temperature remains stable between 49° C. and 50° C. As the gas pressure around the sample is reduced, as represented by block 302, the series of points 402 of the temperature of the sample also begins to fall, as shown by the series 402 in the time period between 50 and 100 seconds. In the tested material, the reduction in pressure causes a generally linear reduction in the temperature of the sample, as indicated by the plot points within time interval 404. The substantially linearly-aligned points within time interval 404 are along a linear trend line through that interval 404.

Eventually, as the temperature and pressure continue to drop, boiling begins in the sample. The onset of boiling can be detected with reference to the temperature over time plot 400 as the series of points 402 transitions from a first generally stable negative slope (within interval 404) to a second generally stable negative slope (with a greater slope magnitude that occurs after the first interval 404). The second time interval 406 shows the second generally stable negative slope of points within the series 402. The first time interval 404 occurs chronologically prior to the second time interval 406 and has a trend line with a lower-magnitude slope than the trend line of the second time interval 406.

A transition or inflection point 408 lies chronologically between the two intervals 404, 406, and it indicates the time and temperature at which boiling begins. Accordingly, in block 304, the controller can detect the onset of boiling in the material sample as the gas pressure is reduced after detecting the presence of two separate generally linear-sloped portions in the series of points 402 (found in time intervals 404 and 406) and then determining that the transition or inflection point 408 (which indicates the onset of boiling) has been recorded.

In some embodiments, each of the intervals 404, 406 can have a minimum duration of about 30 seconds for materials with typical water holding capacities (food and soil samples). In some cases and for some materials, the minimum duration can be shorter or longer, depending on how much time is required to record sufficient data to identify a sufficiently definite trend line. The points included in interval 404 can include the data points prior to the inflection point 408 that represent a line of substantially constant slope. The points included in interval 406 can include the points forming a trend line occurring after the inflection point 408 that represent the greatest negative slope in that segment of the series of points 402.

Figure 5:
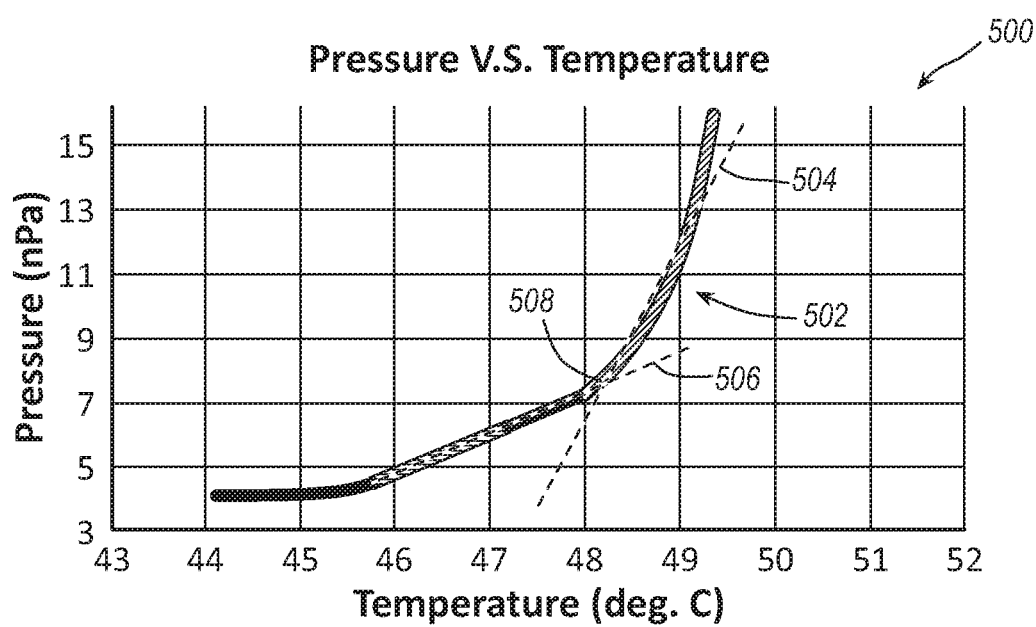
FIG. 5 is a plot of a sample temperature and gas pressure of a testing chamber while measuring water activity using a measurement system of the present disclosure.

Referring again to method 300, in block 306 the controller determines a saturation vapor pressure of the material sample and a temperature of the material sample at the onset of boiling. FIG. 5 illustrates an example plot 500 of a series of points 502 corresponding to the series of points 402, but showing the gas pressure of the chamber in which the sample is located (on the vertical axis) versus the temperature of the sample material (on the horizontal axis). Thus, the plot 500 shows the gas pressure of the chamber for each measured temperature shown in plot 400. After detecting the time intervals 404 and 406 having linear temperature change in plot 400, trend lines 504, 506 can be produced for the corresponding series of points in plot 500 within those intervals 404, 406. Thus, trend line 504 represents the linear regression of the pressure versus temperature plot points 502 from time interval 404. Similarly, trend line 506 represents the linear regression of the pressure versus temperature plot points from time interval 406. The trend lines 504, 506 can have an intersection point 508. That point 508 shows the approximate chamber gas pressure and internal sample temperature at the onset of boiling during the pressure reduction. In other words, that gas pressure and sample temperature are the saturation vapor pressure and the temperature of the material sample at the onset of boiling.

The method 300 can also include a block 308 in which the controller calculates water activity of the sample using the saturation vapor pressure and the temperature of the sample material at the onset of boiling. The water activity of the sample can be computed using the following relationship:

$$a_{ws} = \frac{p_a}{e_0(T_b)}$$

Where in $p_a$ is atmospheric pressure and $e_0(T_b)$ is the saturation vapor pressure at the boiling temperature ($T_b$).

Notably, the material sample is not required to be in vapor equilibrium with its surroundings within the test chamber in order for the water activity measurement to be obtained. The method 300 can therefore be used in situations where water activity is otherwise difficult or impossible to measure due to difficulties in causing the sample material to reach vapor equilibrium with the test chamber air.

Figure 6:
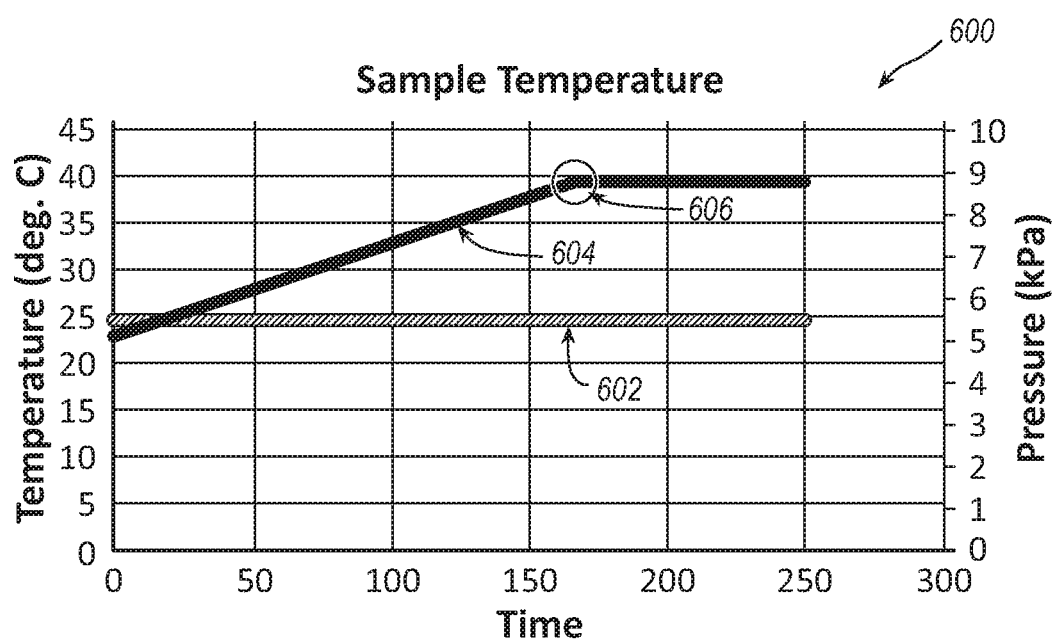
FIG. 6 is a plot of a sample temperature and pressure over time while measuring water activity using a measurement system of the present disclosure.

In some embodiments, the gas pressure of the chamber can be maintained at a substantially constant value while the temperature of the sample is changed. For example, FIG. 6 shows a plot 600 of the gas pressure and sample temperature over time. The first series of points 602 shows the gas pressure over time, and the second series of points 604 shows the sample temperature over time. Accordingly, one aspect of the disclosure relates to systems and methods configured to change (e.g., increase) the temperature of the sample while keeping the gas pressure constant over time and recording at least the sample temperature during that time. Once sufficient data is collected, the sample temperature readings can be referenced to find an inflection point (e.g., point 606) positioned at a transition between two substantially linear segments of the series of points 604 corresponding to temperature. The inflection point 606 indicates the sample temperature at the onset of boiling in the sample material, and because the pressure is held constant, the gas pressure of the chamber at the inflection point 606 is also the saturation vapor pressure at boiling.

In some embodiments, the systems and methods can include controlling the temperature of the testing chamber. Accordingly, another aspect of the disclosure relates to devices and methods that change the gas pressure of the test chamber while keeping the gas temperature in the chamber constant and measuring the gas pressure and temperature of the sample material. Accordingly, systems and apparatuses of the present disclosure can include a temperature control device (e.g., a heating or cooling device) configured to maintain the internal temperature of the test chamber (e.g., 104) while an evacuation device (e.g., 112) modifies the pressure of the chamber. For example, a chamber temperature control device can be used in connection with block 302 of method 300, wherein the controller maintains the chamber temperature at a steady value while reducing the gas pressure therein. Using a chamber temperature control device can help improve sensitivity of the water activity sensor under some conditions.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A method of manufacturing a water activity sensor, the method comprising:
    positioning a temperature sensor in a sealed chamber;
    connecting a gas pressure sensor to the sealed chamber to measure an internal gas pressure of the sealed chamber;
    connecting a gas evacuating device to the sealed chamber; and
    connecting a computing device to the temperature sensor and to the gas pressure sensor, wherein the computing device is configured to:
        determine a temperature of a material sample using the temperature sensor;
        determine the internal gas pressure of the sealed chamber using the gas pressure sensor;
        detect onset of boiling in the material sample; and
        calculate a water activity of the material sample based on the temperature of the material sample at the onset of boiling and based on the internal gas pressure at the onset of boiling;
    wherein detecting the onset of boiling in the material sample comprises adjusting over time at least one of the internal gas pressure and the temperature;
    wherein detecting the onset of boiling in the material sample comprises determining an intersection point of at least two trend lines in a series of points falling on a plot of at least one of:
        the temperature measured over time, and
        the internal gas pressure versus the temperature.

2. The method of claim 1, wherein the computing device is configured to evacuate gas from the sealed chamber using the gas evacuating device.

3. The method of claim 1, wherein the water activity is calculated by dividing the internal gas pressure of the sealed chamber at the onset of boiling by a saturation vapor pressure of the material sample at the onset of boiling.

4. The method of claim 1, wherein the computing device is further configured to keep constant the internal gas pressure of the sealed chamber while adjusting the temperature of the material sample.

5. The method of claim 1, wherein the computing device is further configured to keep constant an internal temperature of the sealed chamber while adjusting the internal gas pressure of the sealed chamber.

6. The method of claim 1, wherein the computing device is further configured to simultaneously adjust the internal gas pressure and the temperature.

7. A water activity measurement device, comprising:
    a housing having an internal chamber configured to receive a material sample including a porous medium having a moisture content;
    a temperature transducer to measure a temperature within the porous medium of the material sample received within the internal chamber;
    a pressure transducer to measure gas pressure in the internal chamber;
    an evacuating device to reduce the gas pressure in the internal chamber; and
    a connector to output measurements from at least one of the temperature transducer and the pressure transducer to a computing device.

8. The water activity measurement device of claim 7, wherein the evacuating device is configured to induce boiling in the material sample.

9. The water activity measurement device of claim 7, wherein the temperature transducer is configured to measure a temperature of a gas in the internal chamber.

10. The water activity measurement device of claim 7, further comprising the computing device, wherein the computing device is configured to reduce the gas pressure in the internal chamber using the evacuating device, receive the temperature from the temperature transducer, and receive the gas pressure from the pressure transducer.

11. The water activity measurement device of claim 10, wherein the computing device is configured to detect an intersection point of two trend lines in a series of points falling on a plot of the temperature over time.

12. The water activity measurement device of claim 10, wherein the computing device is configured to detect a boiling point of the material sample as the gas pressure in the internal chamber is reduced.

13. A method of measuring water activity, the method comprising:
reducing gas pressure on a material sample;
detecting boiling in the material sample as the gas pressure is reduced;
determining a saturation vapor pressure at the material sample and a temperature of the material sample at an onset of the boiling in the material sample; and
calculating water activity using the saturation vapor pressure at the onset of boiling and using the temperature of the material sample at the onset of boiling;
wherein detecting boiling comprises:
determining two trend lines in a series of points falling on a plot of a gas pressure at the material sample versus the temperature of the material sample or falling on a plot of the temperature of the material sample measured over time; and
determining the saturation vapor pressure and the temperature of the material sample where the two trend lines intersect.

14. The method of claim 13, wherein the two trend lines correspond to two substantially linearly aligned portions of the series of points.

15. The method of claim 13, wherein a first trend line of the two trend lines extends along a first portion of the series of points having a lesser slope than a second trend line of the two trend lines extending along a second portion of the series of points, and wherein the second portion of the series of points occurs after the first portion.

16. The method of claim 13, wherein the boiling is detected while the material sample is out of vapor equilibrium with atmosphere surrounding the material sample.

* * * * *